(12) United States Patent
Saito et al.

(10) Patent No.: US 6,911,264 B2
(45) Date of Patent: Jun. 28, 2005

(54) GASKET MATERIAL

(75) Inventors: Hiroshi Saito, Ikoma-gun (JP); Kenichiro Ishikawa, Ikoma-gun (JP)

(73) Assignee: Nichias Corporation, Tokyo (JP)

( * ) Notice: Subject to any disclaimer, the term of this patent is extended or adjusted under 35 U.S.C. 154(b) by 115 days.

(21) Appl. No.: 10/401,949

(22) Filed: Mar. 31, 2003

(65) Prior Publication Data

US 2003/0203220 A1 Oct. 30, 2003

(30) Foreign Application Priority Data

Mar. 29, 2002 (JP) .................................... P.2002-095934

(51) Int. Cl.$^7$ .............................................. B32B 15/06
(52) U.S. Cl. ........................ 428/457; 428/461; 428/462; 428/463
(58) Field of Search ................................ 428/461, 462, 428/463, 465, 457

(56) References Cited

U.S. PATENT DOCUMENTS 5,154,977 A * 10/1992 Saito ........................... 428/457

FOREIGN PATENT DOCUMENTS

| JP | 74031025 B | * | 8/1974 | ........... B44C/00/00 |
| JP | 11-001678 | | 1/1999 | |

* cited by examiner

*Primary Examiner*—Monique R. Jackson
(74) *Attorney, Agent, or Firm*—Nixon & Vanderhye P.C.

(57) ABSTRACT

A gasket material includes a steel plate, and a cured film made of a mixture of an unvulcanized rubber compound and a phenol-modified xylene resin and directly formed on one or each of opposite surfaces of the steel plate. Preferably, the unvulcanized rubber compound is constituted by a mixture of metallic oxide and NBR polymerized with a surface active agent. Further preferably, the cured film is made of a mixture of 88% by weight to 95% by weight of said unvulcanized rubber compound and 5% by weight to 12% by weight of said phenol-modified xylene resin.

4 Claims, No Drawings

GASKET MATERIAL

BACKGROUND OF THE INVENTION

1. Field of the Invention

The present invention relates to a gasket material and particularly to a gasket material excellent in durability against refrigerating machine oil, Freon gas, antifreeze liquid, etc.

2. Description of the Related Art

Generally, a gasket mounted on a compressor for a refrigerating machine in an automobile, or a gasket mounted on an engine has a structure in which a rubber layer are laminated with using a primer on a steel plate. The two steps of forming a primer layer and forming the rubber layer are however required. Therefore, a gasket material using no primer has been developed. For example, JP-A-11-1678 has described a gasket material having a structure in which a film made of a mixture of an unvulcanized rubber compound and a phenolic resin or epoxy resin is directly formed on a steel plate.

In the gasket material using no primer, it is necessary to mix a considerably large amount of the phenolic resin or epoxy resin with the unvulcanized rubber compound in order to obtain sufficient adhesion between the mixture film and the steel plate. As a result, there is brought a disadvantage in that elasticity of the mixture film is lowered so that sealability is lowered.

SUMMARY OF THE INVENTION

The invention is developed in consideration of such circumstances and an object of the invention is to provide a gasket material which has a film excellent in adhesion to a steel plate and having rubber elasticity kept substantially equal to the original rubber elasticity in spite of a structure having no primer layer and which is excellent in sealability particularly against refrigerating machine oil, Freon gas, antifreeze liquid, etc.

To achieve the foregoing object, the invention provides a gasket material including a steel plate, and a cured film made of a mixture of an unvulcanized rubber compound and a phenol-modified xylene resin and directly formed on one or each of opposite surfaces of the steel plate.

DETAILED DESCRIPTION OF THE PREFERRED EMBODIMENTS

The invention will be described below in detail.

A gasket material according to the invention has a structure in which a rubber layer is formed on a steel plate directly without formation of any primer layer.

The steel plate is not particularly limited. Any steel plate such as a stainless steel plate (of ferritic, martensitic or austenitic stainless steel), an SPCC steel plate or an aluminum steel plate as heretofore used in a gasket can be used as the steel plate. Generally, before use, these steel plates are conversion-treated with a chromate or non-chromate treating agent after alkaline degreasing so that antirust films are formed on the steel plates. This conversion treatment may be applied to the steel plate used in the invention. A film of zinc phosphate or iron phosphate is often formed on the SPCC steel plate. This type film may be formed on the SPCC steel plate used in the invention. A steel plate subjected to surface roughening treatment such as shot blasting or scotch blasting may be also used.

A mixture of an unvulcanized rubber compound and a phenol-modified xylene resin is dissolved in an organic solvent to prepare a film-forming solution. The film-forming solution is applied onto one or each of opposite surfaces of the steel plate. A mixture of NBR preferably containing 18% to 50% of nitrile, a surface active agent and metallic oxide can be preferably used as the unvulcanized rubber compound. A polymer polymerized from a short alkyl chain length type material in the presence of an emulsifying agent such as sulfonic acid sodium salt can be preferably used as NBR.

Short alkyl chain type sulfonic acid sodium salt is preferably used as a surface active agent used in polymerization of NBR. Magnesium oxide or calcium oxide is preferably used as metallic oxide. The amount of metallic oxide mixed with NBR is 5% by weight to 15% by weight relative to 75% by weight to 90% by weight of NBR.

The phenol-modified xylene resin dissolved in an alcoholic solvent is used.

Further, 5% by weight to 12% by weight of the phenol-modified xylene resin is mixed with 88% by weight to 95% by weight of the unvulcanized rubber compound.

The organic solvent is not limited if the unvulcanized rubber compound and the phenol-modified xylene resin can be dissolved in the organic solvent. For example, a mixture of 60% by weight to 90% by weight of aromatic hydrocarbon (inclusive of ketone) such as toluene and 10% by weight to 40% by weight of alcoholic liquid such as isopropyl alcohol can be used as the organic solvent. The mixture of the unvulcanized rubber compound and the phenol-modified xylene resin is dissolved in the organic solvent to prepare a film-forming solution having a solid concentration of 20% by weight to 50% by weight.

A gasket material can be produced as follows. The film-forming solution is applied onto the steel plate by a skim coater, a roll coater or the like to form a solution layer having a thickness of 20 $\mu$m to 150 $\mu$m. The solution layer is heated at about 150–240° C. for 5–15 minutes. As a result, a cured film made of the mixture of the unvulcanized rubber compound and the phenol-modified xylene resin is vulcanized and bonded to the steel plate to thereby produce a gasket material. The gasket material produced in this manner according to the invention has the cured film which adheres firmly to the steel plate in spite of absence of any primer layer and which has moderate elasticity to provide excellent sealing performance.

EXAMPLES

The invention will be described below more specifically in connection with examples and comparative examples, but the invention is not limited thereto at all. (Examples 1 to 3 and Comparative Examples 1 to 6)

[Preparation of Samples]

Each of samples was prepared as follows. NBR (containing a surface active agent), metallic oxide and resin were mixed as shown in Table 1 to prepare a mixture. The mixture was dissolved in a mixture solvent of toluene and isopropyl alcohol (48% by weight of isopropyl alcohol) to prepare a film-forming solution having a solid concentration of 42% by weight. In Table, the term "specific NBR" means NBR polymerized from a short alkyl chain type material in the presence of alkyl sulfonic acid sodium salt. The film-forming solution was applied onto a conversion-treated SPCC steel plate by a roll coater so that a solution layer of 65 μm thickness was formed on each of opposite surfaces of the SPCC steel plate. Then, the solution layer was heated at 180° C. for 10 minutes to form a cured film. In this manner, each sample was prepared.

In order to make comparison, a sample (Comparative Example 6) was prepared in such a manner that an NBR rubber compound layer was formed on a primer layer formed by primer coating.

TABLE 1

| | | BLEND | | | | |
|---|---|---|---|---|---|---|
| | Kind of NBR (A) | Metallic oxide (B) | Resin (C) | (A) | (B) | (C) |
| Blend (1) | Specific NBR | Magnesium oxide | Xylene-modified phenolic resin | 100 | 5 | 5 |
| Blend (2) | Specific NBR | Calcium oxide | Xylene-modified phenolic resin | 100 | 10 | 7 |
| Blend (3) | Specific NBR | Magnesium oxide | Xylene-modified phenolic resin | 100 | 15 | 12 |
| Blend (4) | Specific NBR | Magnesium oxide | Phenolic resin | 100 | 15 | 15 |
| Blend (5) | General NBR | None | Epoxy resin | 100 | 0 | 27 |
| Blend (6) | Specific NBR | Silicon oxide | Xylene-modified phenolic resin | 80 | 10 | 7 |
| Blend (7) | General NBR | None | Phenolic resin | 100 | 0 | 25 |
| Blend (8) | Specific NBR | None | Xylene-modified phenolic resin | 100 | 0 | 12 |
| Blend (9) | An NBR rubber compound layer was formed on a primer layer. | | | | | |

Note)
Specific NBR was NBR polymerized from a short alkyl Chain length type material in the presence of alkyl sulfonic acid sodium salt.

Each of the samples was evaluated as follows.
[Evaluation Method]
1. Durability Against Refrigerating Machine Oil/Freon Gas The prepared sample was immersed in a mixture solution of 50% by weight of refrigerating machine oil (PAG oil) used in a refrigerating machine of an automobile and 50% by weight of Freon gas (R134a) as a refrigerant. The sample was left in this state at 130° C. for 500 hours. After the sample was left in this state, the sample was taken out of the mixture solution and subjected to a spiral scoring test and a cross cut tape peeling test.

2. Durability Against Antifreeze Liquid

A half of the prepared sample was immersed (half-immersed) in an automobile radiator coolant (Genuine Toyota Motor Corporation's long-life coolant) so as to be perpendicular to the liquid level of the coolant. The sample was left in this state at 120° C. for 500 hours. After the sample was left in this state, the sample was taken out of the coolant. A non-immersed portion and an immersed portion of the sample are subjected to a spiral scoring test and a cross cut tape peeling test.

Methods used for the respective tests and criteria for evaluation in the respective test were as follows.
(Spiral Scoring Test)

A spiral with a radius of 4.5 mm was drawn 25 times on a surface of the sample by a spiral scoring tester provided according to JIS-K6894. The sample was evaluated by the following criterion. Results were shown in the columns "spiral scoring test" in Table 3.

Criterion for Evaluation

Score 5: The cured film remained fully.

Score 4: A part of the cured film dropped out.

Score 3: About a half of the cured film dropped out.

Score 2: A part of the cured film remained.

Score 1: The cured film dropped out fully.

Incidentally, in Comparative Example 6, the NBR rubber compound layer was evaluated by the same criterion as described above.

(Cross Cut Tape Peeling Test)

The test was performed according to JIS-K5400 and by a procedure having the steps of:

(1) cutting the sample so that a grid ruled into 2-mm squares and having 100 intersection points is formed in a surface of the sample;
(2) sticking an adhesive tape onto the gridded surface and rubbing the adhesive tape with a rubber eraser so that the adhesive tape adheres to the gridded surface perfectly;
(3) peeling the adhesive tape perpendicularly from the sample surface instantaneously while holding an end of the adhesive tape when 1–2 minutes has passed after the adhesion of the tape; and
(4) counting the number of remaining intersection points by observing the sample surface after peeling.

The number of remaining intersection points was shown in a corresponding place on the columns "cross cut test" in Table 3.

3. Sealing Test

Flanges, bolts and a gasket according to the specifications shown in Table 2 were used. The sealing test was performed by a procedure having the steps of:

(1) tightening the flanges by torque of 14.7 N·m while sandwiching the gasket between the flanges;
(2) connecting a nozzle located in the center of the flanges to a hose of a nitrogen gas cylinder;
(3) immersing the flanges in a water tank; and
(4) opening a regulator valve of the gas cylinder gradually.

Pressure at a point of time when air bubbles were observed was written as sealing pressure in a corresponding place on the column "sealing pressure" in Table 3.

TABLE 2

| SPECIFICATIONS OF FLANGE AND GASKET | | |
|---|---|---|
| Flange | Shape | Φ155 mm × 16 mm, tightened by four M16 bolts |
| | Material | SUS304 (inclusive of flange and bolts) |
| | Surface roughness | 17.0 Rz |
| | Tightening torque | 14.7 N · m |
| Gasket | Shape | Φ90 mm × 72 mm (emboss: Φ81 mm, bead: 2.0 W × 0.3 H) |

TABLE 3

EVALUATION RESULT

|  | Blend (Table 1) | Resistance to refrigerating machine oil/Freon gas (PAG/R134a) | | Resistance to antifreeze liquid | | | |
|---|---|---|---|---|---|---|---|
|  |  | Cross cut test | Spiral scoring test | Full immersion Cross cut test | Half immersion | | Sealing pressure (MPa) |
|  |  |  |  |  | Non-immersed portion Spiral scoring test | Immersed portion |  |
| Example 1 | Blend (1) | 100/100 | 5 | 100/100 | 5 | 5 | 3.2 |
| Example 2 | Blend (2) | 100/100 | 5 | 100/100 | 5 | 5 | 3.3 |
| Example 3 | Blend (3) | 100/100 | 5 | 100/100 | 5 | 5 | 3.1 |
| Comparative Example 1 | Blend (4) | 50/100 | 3 | 50/100 | 3 | 4 | 3.3 |
| Comparative Example 2 | Blend (5) | 40/100 | 3 | 40/100 | 4 | 3 | 1.6 |
| Comparative Example 3 | Blend (6) | 75/100 | 2 | 60/100 | 3 | 3 | 3.3 |
| Comparative Example 4 | Blend (7) | 60/100 | 3 | 20/100 | 1 | 2 | 1.8 |
| Comparative Example 5 | Blend (8) | 85/100 | 4 | 65/100 | 3 | 4 | 3.1 |
| Comparative Example 6 | Blend (9) | 100/100 | 5 | 100/100 | 5 | 5 | 3.2 |

As shown in Table 3, in each of Examples 1 to 3 using NBR, metallic oxide and phenol-modified xylene resin according to the invention, an evaluation result of adhesion equivalent to that in Comparative Example 6 using primer coating is obtained. In each of Examples 1 to 3, sealing performance equivalent to that in Comparative Example 6 is also obtained. On the other hand, Comparative Examples 1 to 5 which do not satisfy the requirements of the invention are remarkably inferior in performance of all evaluation items.

As described above, the gasket material according to the invention can be produced easily without necessity of primer coating and is excellent in durable adhesion and sealability against refrigerating machine oil, Freon gas and antifreeze liquid.

What is claimed is:

1. A gasket material comprising:
   a steel plate; and
   a cured film made of a mixture of an unvulcanized rubber compound and a phenol-modified xylene resin and directly formed on at least one of opposite surfaces of the steel plate,
   wherein the unvulcanized rubber compound includes a mixture of metallic oxide and acrylonitrile-butadiene rubber (NBR) polymerized with a surface active agent; and
   wherein the cured film is made of a mixture of 88% by weight to 95% by weight of the unvulcanized rubber compound and 5% by weight to 12% by weight of the phenol-modified xylene resin.

2. The gasket material according to claim 1, wherein the surface active agent is sulfonic acid sodium salt.

3. The gasket material according to claim 1, wherein the metallic oxide is magnesium oxide or calcium oxide.

4. The gasket material according to claim 3, wherein an amount of the metallic oxide mixed with the NBR is 5% by weight to 15% by weight relative to 75% by weight to 90% by weight of the NBR.

* * * * *